United States Patent
Wittenschlaeger et al.

(10) Patent No.: US 12,021,683 B2
(45) Date of Patent: *Jun. 25, 2024

(54) FABRIC-BASED VIRTUAL AIR GAP PROVISIONING, SYSTEM AND METHODS

(71) Applicant: Nant Holdings IP, LLC, Culver City, CA (US)

(72) Inventors: Thomas M. Wittenschlaeger, Flowery Branch, GA (US); Nicholas James Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/533,939

(22) Filed: Nov. 23, 2021

(65) Prior Publication Data

US 2022/0086041 A1 Mar. 17, 2022

Related U.S. Application Data

(63) Continuation of application No. 16/692,879, filed on Nov. 22, 2019, now Pat. No. 11,212,169, which is a
(Continued)

(51) Int. Cl.
*H04L 41/0806* (2022.01)
*H04L 9/40* (2022.01)
(Continued)

(52) U.S. Cl.
CPC .......... *H04L 41/0806* (2013.01); *H04L 12/12* (2013.01); *H04L 45/04* (2013.01);
(Continued)

(58) Field of Classification Search
None
See application file for complete search history.

(56) References Cited

U.S. PATENT DOCUMENTS 6,256,295 B1 7/2001 Callon
7,352,745 B2 4/2008 Perera et al.
(Continued)

FOREIGN PATENT DOCUMENTS

WO WO-2010131150 A1 11/2010
WO WO-2012068443 A1 5/2012
WO WO-2012092031 A1 7/2012

OTHER PUBLICATIONS

Office Action from corresponding U.S. Appl. No. 16/692,879 dated May 27, 2021.
(Continued)

*Primary Examiner* — Mariela Vidal Carpio
(74) *Attorney, Agent, or Firm* — Harness Dickey & Pierce P.L.C.

(57) ABSTRACT

A device configured to or programmed to instantiate an isolated sub-fabric is presented. A network configuration device uses a virtual air gap policy to instantiate a sub-fabric from a fabric of networking nodes. The sub-fabric is configured with an internal routing policy that respects the nature of the defined isolation. Further, the fabric is provisioned with a virtual air gap that ensures the external networking nodes respect the isolation of the sub fabric.

18 Claims, 4 Drawing Sheets

Related U.S. Application Data continuation of application No. 14/721,766, filed on May 26, 2015, now Pat. No. 10,491,467.

(60) Provisional application No. 62/002,657, filed on May 23, 2014.

(51) Int. Cl.
  *H04L 12/12* (2006.01)
  *H04L 43/0817* (2022.01)
  *H04L 43/10* (2022.01)
  *H04L 45/02* (2022.01)

(52) U.S. Cl.
  CPC .............. *H04L 63/10* (2013.01); *H04L 63/20* (2013.01); *H04L 43/0817* (2013.01); *H04L 43/10* (2013.01); *Y02D 30/50* (2020.08)

(56) References Cited

U.S. PATENT DOCUMENTS

| | | | |
|---|---|---|---|
| 7,548,545 B1 | 6/2009 | Wittenschlaeger | |
| 7,548,556 B1 | 6/2009 | Wittenschlaeger | |
| 7,599,314 B2 | 10/2009 | Wittenschlaeger | |
| 7,603,428 B2 | 10/2009 | Wittenschlaeger | |
| 7,673,011 B2 | 3/2010 | Archer et al. | |
| 7,742,445 B2 | 6/2010 | Stewart et al. | |
| 7,904,602 B2 | 3/2011 | Wittenschlaeger | |
| 8,001,280 B2 | 8/2011 | Blumrich et al. | |
| 8,468,244 B2 * | 6/2013 | Redlich | G06Q 50/18 715/255 |
| 10,491,467 B2 | 11/2019 | Wittenschlaeger et al. | |
| 2002/0053032 A1 | 5/2002 | Dowling et al. | |
| 2005/0055418 A1 * | 3/2005 | Blanc | H04L 41/30 700/219 |
| 2006/0291455 A1 | 12/2006 | Katz et al. | |
| 2008/0137532 A1 | 6/2008 | Namburi et al. | |
| 2009/0064307 A1 | 3/2009 | Holar et al. | |
| 2009/0103524 A1 * | 4/2009 | Mantripragada | H04L 65/1079 370/352 |
| 2009/0136909 A1 * | 5/2009 | Asukai | A61B 5/7246 434/236 |
| 2009/0154454 A1 | 6/2009 | Wittenschlaeger | |
| 2009/0228575 A1 | 9/2009 | Thubert et al. | |
| 2009/0274157 A1 | 11/2009 | Vaidya et al. | |
| 2009/0316619 A1 | 12/2009 | Wittenschlaeger | |
| 2010/0061250 A1 * | 3/2010 | Nugent | H04L 41/5045 370/242 |
| 2010/0312913 A1 | 12/2010 | Wittenschlaeger | |
| 2010/0318785 A1 * | 12/2010 | Ozgit | H04L 63/0209 713/153 |
| 2011/0066851 A1 | 3/2011 | Bello et al. | |
| 2011/0138457 A1 * | 6/2011 | Jolfaei | H04L 69/08 726/14 |
| 2012/0297043 A1 * | 11/2012 | Davis | H04L 45/60 709/223 |
| 2013/0036236 A1 | 2/2013 | Morales et al. | |
| 2013/0042115 A1 * | 2/2013 | Sweet | G06F 21/577 713/176 |
| 2013/0305341 A1 * | 11/2013 | Baker | H04W 28/26 726/11 |
| 2013/0326002 A1 * | 12/2013 | Leuoth | H04L 63/1441 709/216 |
| 2014/0073362 A1 * | 3/2014 | Kawata | G06Q 50/01 455/456.3 |
| 2014/0237156 A1 | 8/2014 | Regula et al. | |
| 2014/0282922 A1 | 9/2014 | Iwanski et al. | |
| 2014/0362808 A1 * | 12/2014 | Zhong | H04L 45/566 370/329 |
| 2015/0150113 A1 | 5/2015 | Robb et al. | |
| 2015/0169893 A1 | 6/2015 | Desai | |
| 2015/0301880 A1 * | 10/2015 | Allu | G06F 11/0709 714/4.3 |
| 2016/0323175 A1 * | 11/2016 | Liu | H04L 12/6418 |
| 2017/0041329 A1 * | 2/2017 | Göbel | H04L 63/145 |
| 2017/0063920 A1 * | 3/2017 | Thomas | H04L 9/002 |
| 2020/0259709 A1 | 8/2020 | Wittenschlaeger et al. | |

OTHER PUBLICATIONS

Capuno, Welcome to Infinera's Blog, Infinera Digital Optical Transport Solutions—Blog, 2011.

Infinera, Is Your Network Ready?, Infinera Digital Optical Transport Solutions—Bloq, 2011.

Infinera, Inventing the Colorless, Directionless and Contentionless ROADM, Infinera Digital Optical Transport Solutions—Blog, 2011.

Infinera, Nettlix's Price Hike and the Bandwidth Dilema, Infinera Digital Optical Transport.

Physorg.com, New Technique Offers Enhanced Security for Sensitive Data in Cloud Computing, Physorg.com website, Technology/Computer Science, 2011.

Physorg.com, Physicists Map Spiraling Light to Harness Untapped Data Capacity, Phvsora.com website, Phvsics/ General Phvsics, 2011.

Showalter, Mark, Introducing The New Infinera DTN-X, Infinera Digital Optical Transport Solutions—Blog, 2011.

Office Action from corresponding U.S. Appl. No. 14/721,766 dated Dec. 14, 2018.

Office Action from corresponding U.S. Appl. No. 14/721,766 dated Apr. 19, 2018.

Office Action from corresponding U.S. Appl. No. 14/721,766 dated Sep. 20, 2017.

* cited by examiner

Configuration Vector F = {4, 7, 2, 5, 7, 3}

Weight Vector W = {0.25, 1.5, 1.0, 1.0, 0, 0.1}

Air Gap Distance $D_A$ = W · F = 18.8

FABRIC-BASED VIRTUAL AIR GAP PROVISIONING, SYSTEM AND METHODS

CROSS REFERENCE TO RELATED APPLICATIONS

This application is a continuation of U.S. application Ser. No. 16/692,879 filed Nov. 22, 2019, which is a continuation of U.S. application Ser. No. 14/721,766 filed May 26, 2015, which claims the benefit and priority of U.S. Provisional Application No. 62/002,657 filed May 23, 2014. The above applications and all other extrinsic references referenced herein are incorporated by reference in their entirety.

FIELD OF THE INVENTION

The field of the invention is network fabric isolation technologies.

BACKGROUND

The background description includes information that may be useful in understanding the present invention. It is not an admission that any of the information provided herein is prior art or relevant to the presently claimed invention, or that any publication specifically or implicitly referenced is prior art.

Providing network security for networking fabrics continues to be an ever increasing problem. Current networks continue to suffer from attacks by external threats. In more private settings, in the military or government for example, fabrics still can suffer from internal threats because the fabrics lack proper isolation. The issue is so severe that the military has gone so far as to implement multiple, duplicative, distinct, and physically isolated networks on war ships. For example, a public network is physically distinct from a secret network, which is further distinct from a top secret network. Unfortunately, while such an approach does indeed secure each network relative to each other, the approach requires three times the hardware, three times the cabling, and three times the maintenance. The overhead can be quite costly.

Physically isolating one network from another is often referred to as "air gapping", or isolating the networks via an "air gap". U.S. Pat. No. 8,468,244 to Redlich et al. titled, "Digital Information Infrastructure and Method for Security Designated Data and with Granular Data Stores", filed Apr. 29, 2009, describes various uses for air gapped systems and their deficiencies. One of the most critical issues is how, when the need arises, to transfer data from one isolated network to another.

One approach taken in the past to provide for communication between two isolated networks is to leverage an external, trusted entity to broker such data exchanges. Some references refer to this approach as a "virtual air gap". For example, U.S. patent application publication 2010/0318785 to Ozgit titled, "Virtual Air Gap—VAG System", filed internationally on Aug. 15, 2009, seeks to provide communication between isolated networks via a shared memory. In a somewhat similar vein, U.S. patent application publication 2002/0053032 to Dowling et al. titled, "System and Method for Secure Data Transmission", filed May 18, 2001, seeks to maintain a virtual air gap between resource requesters and providers via a trusted session sub-layer. In these examples, the concept of an air gap is violated by allowing communication between the systems to exist in the first place.

Thus, there remains a need for the ability to configure isolated fabrics in a manner that creates communication isolation via a true virtual air gap, while also leveraging a single set of networking nodes.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems, and methods in which a network fabric can be reconfigured with sub-fabrics that are isolated via a virtual air gap. One aspect of the inventive subject matter includes a network configuration device (e.g., server, networking nodes, switch, router, web server, etc.) that is configured or programmed to instantiate sub-fabrics within a network fabric according to a virtual air gap policy. Disclosed network configuration devices comprise a memory configured to store one or more virtual air gap policies that describe the nature of how the instantiated sub-fabric should be isolated relative to the main fabric or other nodes. The virtual air gap policy includes fabric isolation criteria that define the nature of the isolation with respect to attributes in a fabric configuration space (e.g., physical isolation, temporal isolation, data isolation, logical isolation, etc.). The network configuration device further comprises a fabric provisioning module coupled with the memory and that is configured or programmed to construct the sub-fabric along with the associated virtual air gap. The fabric provisioning module instantiates the sub-fabric from at least some of the networking nodes in the main fabric. The network configuration device configures the sub-fabric with an internal routing policy by which the sub-fabric ensures that internal packets remain isolated and respects the fabric isolation criteria. The provisioning module also provisions the fabric with a virtual air gap around the sub-fabric according to the virtual air gap policy. The virtual air gap can be considered to form a DMZ, possibly having a characterized distance, between the main fabric and the newly instantiated, isolated sub-fabric. When ready, the network configuration device can cause the sub-fabric to be activated.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
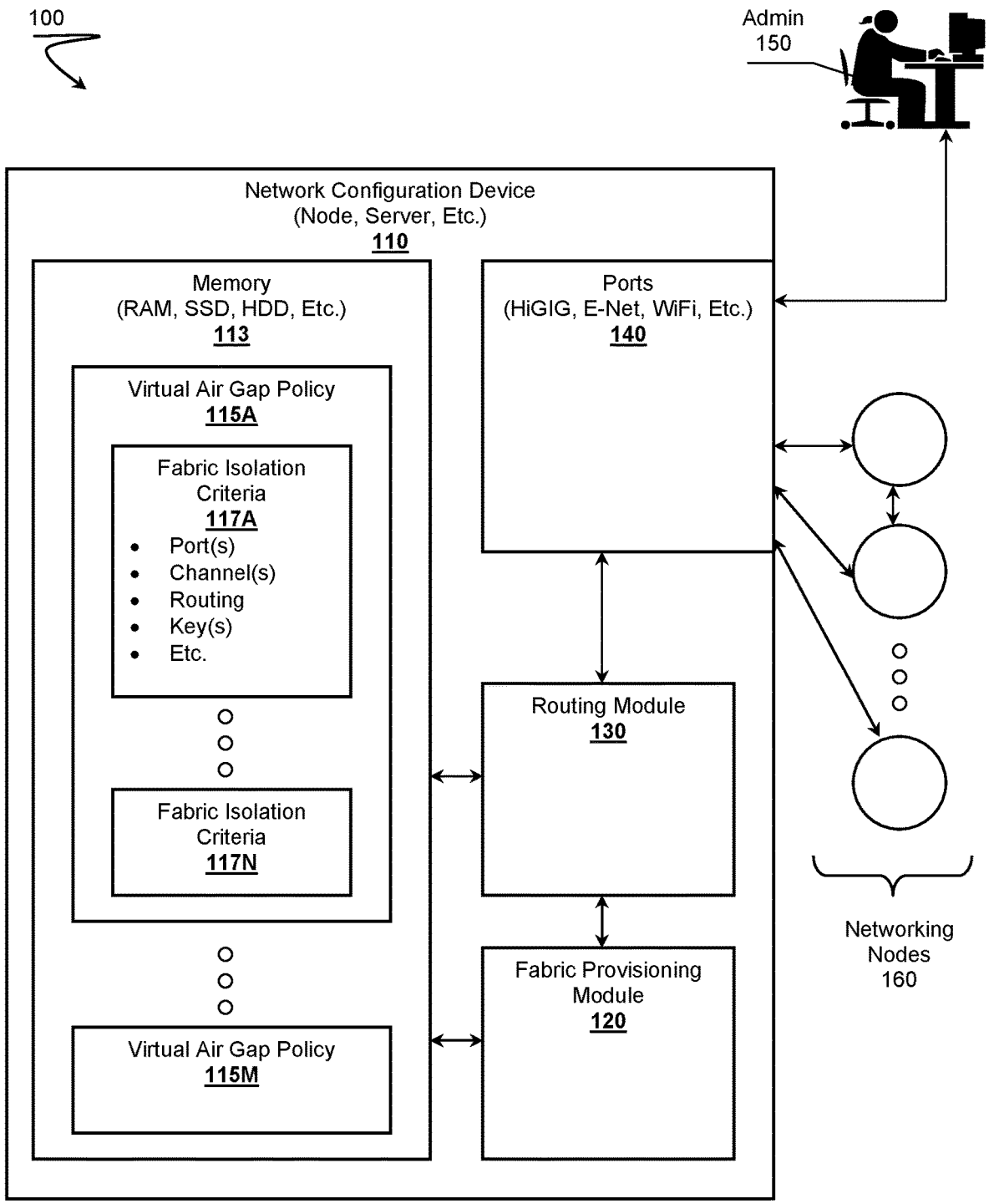
FIG. 1 is a schematic overview of a network configuration device capable of instantiating a sub-fabric and an associated virtual air gap.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device or otherwise make the computing device operable to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including using a network configuration device to lock down communication among isolated network fabrics, while also allowing such fabrics to be deconstructed and re-integrated into a larger whole fabric.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following disclosure describes construction of isolated sub-fabrics within existing network fabrics of physically interconnected networking nodes (e.g., switches, routers, servers, peers, mobile devices, etc.). The sub-fabrics can be configured according to an internal routing policy in a manner where the sub-fabric can be largely unaware of the external fabric. Further, the remaining portions of the external fabric can be provisioned with a virtual air gap that can be considered as forming a halo or DMZ around the sub-fabric. The nature of the virtual air gap can be defined according to fabric isolation policy with respect to fabric configuration space.

FIG. 1 presents an overview of network fabric 100 that includes multiple networking nodes 160, at least one network configuration device 110, and possibly administrator 150. Networking nodes 160 represent computing devices capable of routing digital data, preferably packet data, among nodes 160 or to edge devices; perhaps a computer workstation used by administrator 150. The network traffic can be routed according to routing rules stored in the memory of nodes 160. Networking nodes 160 are physically interconnected with each other via communication ports and supporting physical layers. For example, networking nodes 160 can comprise network switches interconnected via optic fiber connections, possibly including those offered Ciena® or Infinera®. In some embodiments, the interconnections can also comprise wireless connections.

Administrator 150 represents an entity (e.g., human user, network management device, server, etc.) that interacts with the network configuration device 110 to establish initial fabric policies. The administrator 150 can communicate with the various device in fabric 100 over the connections using one or more protocols (e.g., HTTP, HTTPS, SSH, SSL, SNMP, etc.).

Network configuration device 110 is a management device that is configured or programmed to configure devices in fabric 100, including networking nodes 160. In some embodiments, networking configuration device 110 could be a remote server, external to fabric 100. In other embodiments, network configuration device 110 could be the same computing device as operated by administrator 150. Still, further and more likely, network configuration device 110 is also one of networking nodes 160. In more preferred embodiments, each of networking nodes 160 is fungible with respect to the roles or responsibilities of network configuration device 110.

Network configuration device 110 is coupled with or is part of fabric 100. The example device shown in FIG. 1 comprises several components supporting the functionality of network configuration device 110. The components can include ports 140, routing modules 130, fabric provisioning module 120, and memory 113. In embodiments, where network configuration device 110 is not one of networking nodes 160, routing module 130 will likely not be present.

Routing module 130 is configured or programmed to route packets through networking configuration device 110 via ports 140 according to one or more rules sets. For example, routing module 130 might operate according to cut-through routing rules stored in memory 113. The routing rules can be updated, configured, or otherwise modified so that routing module 130 can adapt to new circumstances.

Ports 140 comprise one or more communication interfaces through which configuration device 110 is able to exchange data with remote devices; networking nodes 160 for example. Ports 140 can include wired ports, wireless ports, optic fiber ports, or other types of ports. More preferred ports 140 comprise long haul optic fiber ports.

Memory 113 can take on many different forms depending on the nature of configuration device 110. For example, memory 113 can include RAM, Flash, solid-state drives (SSD), hard disk drives (HDD), ROM, or other types of memory. As illustrated, memory 113 is configured to store one or more virtual air gap policies 115A through 115M, collectively referred to as virtual air gap policies 115. Each of the virtual air gap policies 115 could relate to different, isolated sub-fabrics. Virtual air gap policies 115 describe the nature of a corresponding virtual air gap that isolates a sub-fabric.

Consider virtual air gap policy 115A as an example. Policy 115A further includes one or more of fabric isolation criteria 117A through 117N, collectively referred to as fabric isolation criteria 117, that are defined with respect to a fabric configuration space (see discussion related to FIG. 2). Fabric isolation policy 117A includes rules by which a sub-fabric should be isolated in terms of the configuration space's attributes (e.g., data isolation, geographical isolation, temporal isolation, etc.). As illustrated, virtual air gap policies 115 could include one or more sets of fabric isolation criteria 117. Each of the fabric isolation criteria 117 could represent different configurations for the same sub-fabric; perhaps a public configuration, private configuration, secret configuration, top-secret configuration, compartmentalized configuration, or other configurations.

Fabric provisioning module 120 is configured or programmed to use one or more of virtual air gap policy 115 to construct a sub-fabric that is isolated according to corresponding fabric isolation criteria 117. Fabric provisioning module 120 obtains data regarding the physical nature of the sub-fabric, perhaps having an XML or JSON file including the desired characteristics of the sub-fabric. The fabric definition file can include information, such as node identifiers, physical locations, preferred communication channels, security tokens or keys, and/or other items that would be useful when creating the target sub-fabric.

Figure 3:
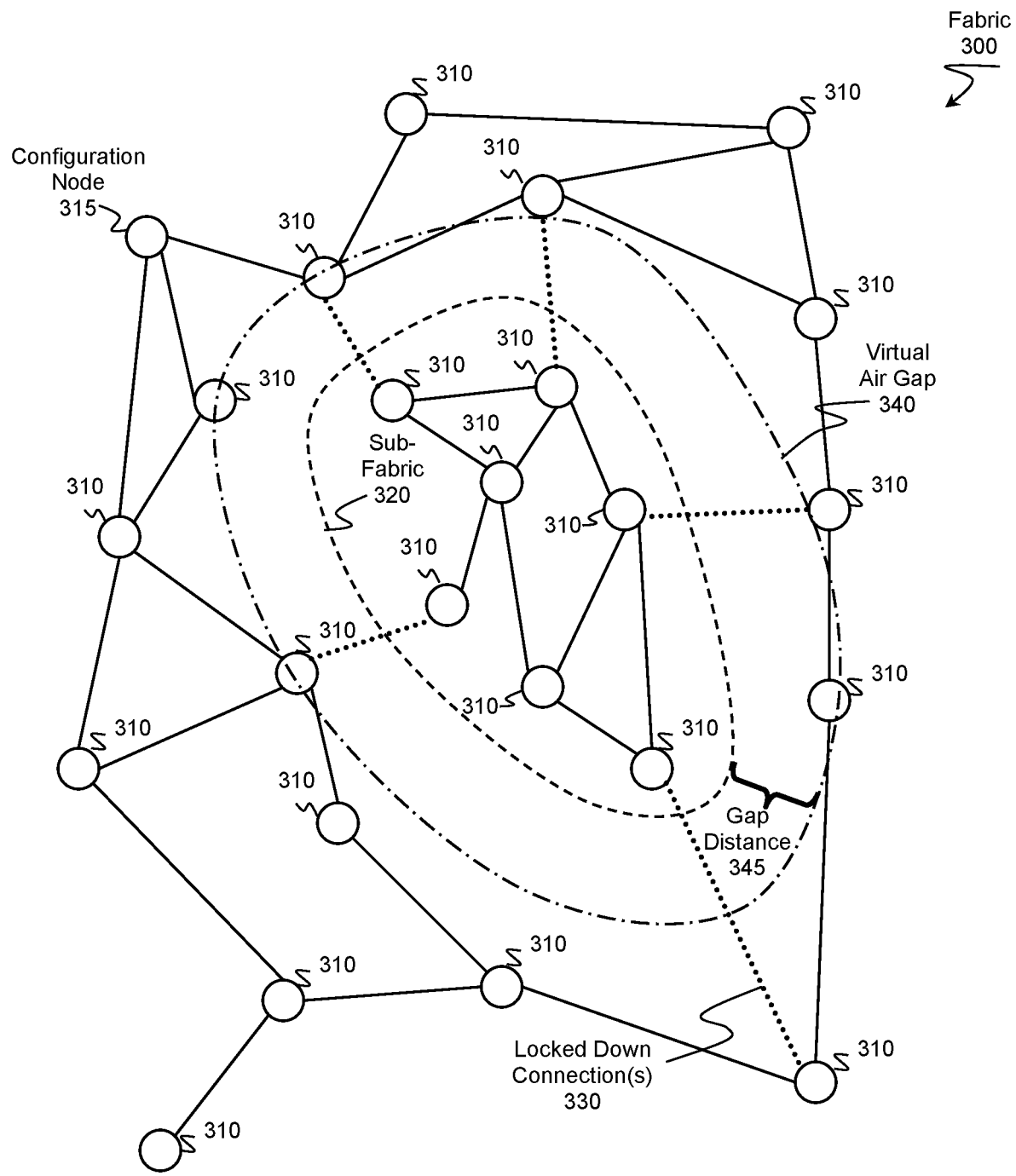
FIG. 3 presents an illustration of a sub-fabric surrounded by a virtual air gap within a fabric of physically interconnected nodes.

Once fabric provisioning module 120 collects the desired sub-fabric characteristics, module 120 instantiates the sub-fabric within fabric 100 from at least some of networking nodes 160 (see discussion related to FIG. 3). The fabric provisioning module 120 communicates with target networking nodes 160 by providing relevant configuration files (e.g., routing path descriptions, cryptographic keys, memory allocations, CPU allocations, core allocations, communication channel maps, etc.).

Fabric provisioning module 120 further configures the sub-fabric with an internal routing policy according to fabric isolation criteria 117. Thus, in some aspects of the invention, the fabric provisioning module 120 comprises a router. In such aspects, the fabric provisioning module 120 can be referred to as a fabric provisioning router. One or more of fabric isolation criteria 117 include rules or structures by which the sub-fabric manages internal communications amongst its member elements or corresponding edge devices. The internal routing policy can be constructed so that networking nodes 160 within the sub-fabric are only aware of each other and not aware of external elements, thus ensuring that the sub-fabric is self-isolated (i.e., it is unaware of external elements).

Fabric provisioning module 120 is further configured or programmed to provision fabric 100 with a virtual air gap relative to the sub-fabric according to the virtual air gap policy. At this point provisioning module 120 can be considered as creating a DMZ or an isolation halo around the sub-fabric to further enforce the sub-fabrics isolation from an external perspective. It should be appreciated that the virtual air gap can be considered to have a size or shape characterized with respect to the fabric configuration space. Thus, the size or shape of the virtual air gap can be dimensioned with respect to physical parameters (e.g., physical distance, physical components, etc.) or logical parameters (e.g., address space, channel identifiers, etc.).

In some embodiments, fabric provisioning module 120 can be configured to cause a state change of physical interconnects (e.g., ports 140, etc.) between networking nodes 160 when fabric 100 is provisioned with the virtual air gap. The physical state change could include toggling power to the port, physically disconnecting/reconnecting a communication cable, disabling/enabling port drivers, or other type of state change that would support the nature of the virtual air gap.

Once fabric provisioning module 120 has suitably established relevant elements within the sub-fabric, it can cause the sub-fabric to become activated. In some embodiments, provisioning module 120 might instruct the sub-fabric to be activated upon configuration of the sub-fabric's internal routing policy. In other embodiments, the sub-fabric might be activated after establishing the virtual air gap. For example, that last communication between network configuration device 110 and the sub-fabric might be an activation command just as the virtual air gap takes effect.

Network configuration device 110 can also establish one or more management nodes within the sub-fabric where the management node ensures the sub-fabric retains coherency. The management node can also serve other functions beyond managing the sub-fabric. In some embodiments, the management node can be instructed to reach out to network configuration device 110 so that the external world has some visibility with respect to the health of the sub-fabric.

Consider a scenario where the sub-fabric is intended to be substantially locked down. In such a case, the fabric isolation criteria could include rules for establishing a heart-beat protocol between the management node of the sub-fabric and network configuration device 110. The heart-beat protocol could be configured to send a packet external to the sub-fabric when necessary according to the heart-beat protocol. Alternatively, one of the networking nodes of the sub-fabric could be configured to receive a heart-beat packet from external to the sub-fabric. The packet could be sent on a regular basis or even irregular basis for added security. A regular basis could include sending a status packet every second, minute, day, month, or other time period. When the packet is to be sent, network configuration device 110 can ensure a connection is enabled so that the packet can be received. An irregular basis might be established based on a key or secret token, perhaps based on a pseudo-random number generator. If both the network configuration device 110 and the sub-fabric management nodes know the key, then they can synchronize packet transmission and reception.

In some circumstances, the sub-fabric can be completely locked down, perhaps due to top-secret requirements. In such cases, there are multiple options available with respect to external contact. In the most severe case, the sub-fabric is completely cut off and is not permitted to rejoin the main fabric. In other, less severe cases, the management node of the sub-fabric can be configured to reach out through the virtual air gap at a specified time, perhaps after the sub-fabric has completed its mission.

Some embodiments will require the sub-fabric to take on specific, mission critical configurations. In such cases, should an attacker or threat manage to access the configuration information, they might be able to glean secrets regarding the sub-fabric's usage or mission purpose. For example, the configured routing paths through the sub-fabric might indicate where critical nodes exist, which nodes have access to sensitive information, or where edge devices might be located. To further increase security, the sub-fabric can be configured with one or more "wipe-clean" policies. The wipe clean policy can include rules or data that ensure the sub-fabric is cleansed of sensitive information before the sub-fabric is rejoined with the main fabric or otherwise reconfigured. Thus, the sub-fabric can be further configured to wipe its memory clean before rejoining the main fabric or reaching back out to network configuration device 110.

One possible approach is that networking nodes 160 within the sub-fabric could obtain a NULL or "zeroed" configuration file that mirrors the sub-fabric main configuration files. Before the sub-fabric or its networking nodes are released, the NULL files can be used to overwrite existing configuration files in memory or on disk. In some embodiments, each node can simply overwrite relative portions, or all portions, of memory. In more extreme cases, the entire node can be wiped clean of all configuration information, including firmware files (except perhaps a boot-loader; e.g., a base board management controller running BOOTP for example). In such cases, the networking nodes essentially become bricks until a new firmware image is loaded, possibly over the network interconnections. Thus, the inventive subject matter is considered to include conducting a wire-speed "wipe" of the sub-fabric. If all the networking nodes of the sub-fabric are configured with a count-down timer, they could simultaneously or instantaneously conduct a wipe clean operation. Full sub-fabric wipes could be configured to accompany the tear down of all sub-fabric connections upon conclusion of the traffic transmitted thereon.

Rather than using a NULL configuration file, it is also possible to provide fictional or honey pot configuration file for the sub-fabric. Rather than wiping the sub-fabric clean, the sub-fabric can be reconfigured with one or more fictional configurations. This approach has several advantages. First, if a threat does observe the fictional configuration file, they learn nothing of value. Second, should the threat take action on the false information, then they can be tracked or identified based on the actual information used. Third, the fictional configuration files can be constructed with unique signatures so that if a threat takes action based on the false data, the point in time that breach happened can be identified based on a correlation between the actions taken and the unique signature.

Figure 2:
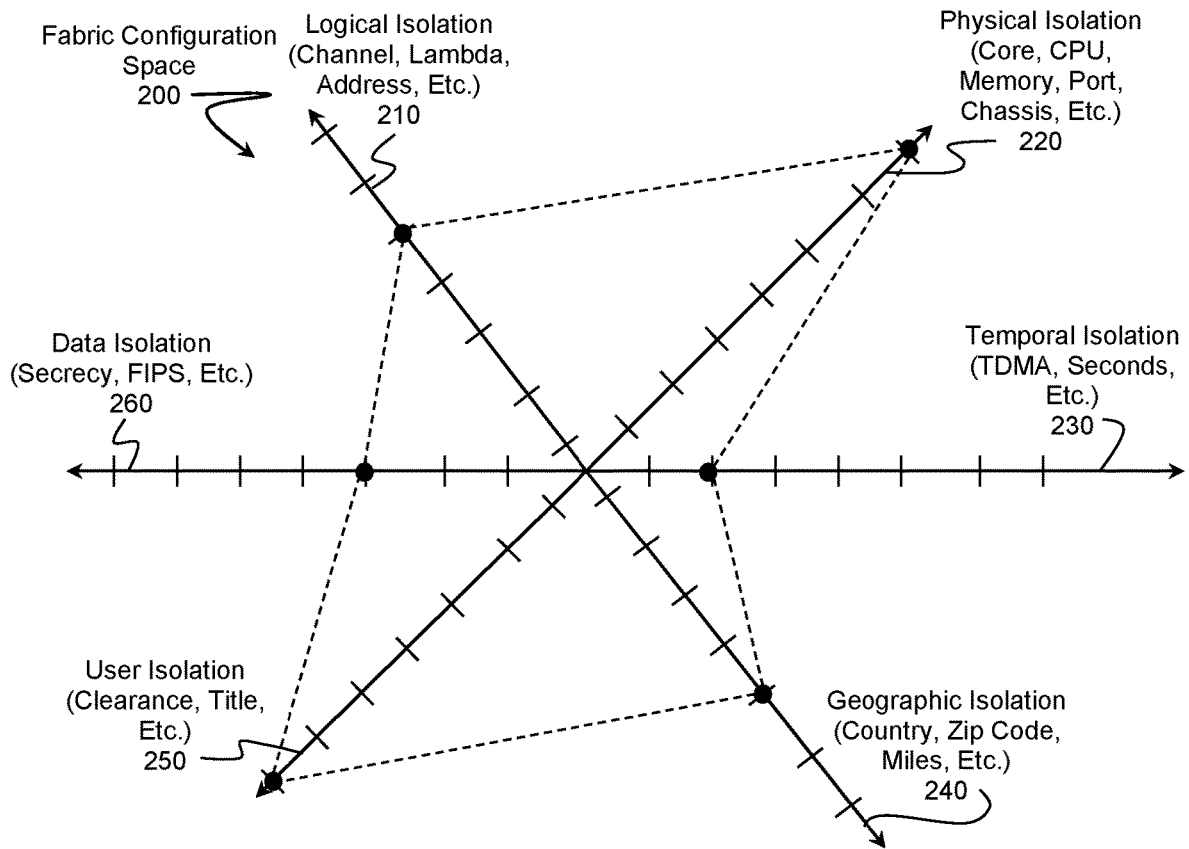
FIG. 2 provides a representation of a fabric configuration space that can be used to define fabric isolation criteria defining the nature of a virtual air gap.

FIG. 2 presents more details with respect to fabric configuration space 200 that can be used to generate one or more sets of fabric isolation criteria. Fabric configuration space 200 can comprise a multi-dimensional attribute space as illustrated having any practical number of configuration dimensions. In the example shown, fabric configuration space 200 comprises six dimensions that correspond to logical isolation dimension 210, physical isolation dimension 220, temporal isolation 230, geographic isolation dimension 240, user isolation dimension 250, and data isolation dimension 260. A fabric's virtual air gap can be characterized by one or more attributes or values for one or more of the dimensions. The attribute values in each dimension can include normalized dimension values, assigned enumerations, absolute values, or other types of values.

Logical isolation dimension 210 represents attributes or values indicating how isolated a sub-fabric should be with respect to logical configuration parameters. Example logical configuration parameters include specified communication channels (e.g., wavelengths), distinct addressing or address spaces, or other logical configuration schemes. The more logically isolated the sub-fabric, the greater the corresponding dimension value or values.

Physical isolation dimension 220 represents attributes or values indicating how physically isolated the sub-fabric should be relative to other nodes. For example, the sub-fabric could be isolated from the main fabric at the component level (e.g., no overlapping with CPUs, cores, memories, etc.) or even at the device level (e.g., chassis, rack, etc.). In some embodiments, the dimensions could comprise a hierarchical space. With respect to physical isolation dimension 220, the hierarchal space might be represented (from smallest granularity to largest granularity) as: {memory, core, CPU, port, chassis, rack, facility}. If a sub-fabric is isolated at the rack level, then it would inherit memory isolation as well. For such hierarchies, each level could be assigned values, possibly normalized values, say {1, 2, 3, 4, 5, 6, 7}, to represent the degree of isolation with respect to the hierarchy.

Temporal isolation dimension 230 represents attributes or values that indicate how networking nodes of the sub-fabric should be isolated with respect to time. For example, the sub-fabric might be periodically activated for a limited time, while at other times is shares its resources with other networking nodes. In some embodiments, temporal isolation could be achieved through application of TDMA on one or more channels used by the sub-fabric, or through time sharing.

Geographic isolation dimension 240 represents attributes or values indicating how isolated the sub-fabric should be from other networking nodes based on physical distance. The geographical attributes could include physical distance (e.g., miles, Km, etc.), zip code requirements, country or border requirements, jurisdictional requirements, or other geographical values.

User isolation dimension 250 includes attributes or values that represent how isolated the sub-fabric should be from the perspective of users. Such attributes might include clearance levels, military rank, group assignments, access control lists, or other user-related attributes.

Data isolation dimension 260 comprises attributes of values with respect to isolation of data. For example, the data isolation attributes might indicate a level of FIPS-140 security to be applied to stored data (e.g., level 1, level 2, level 3, level 4; see csrc.nist.gov/publications/fips/fips140-2/fips1402.pdf), or represent strength of cryptographic keys used to encrypt data.

Use of TDMA as fabric configuration criteria was discussed above as part of temporal dimension 230. Other types of multiple access techniques can also be used as part of configuration of a virtual air gap. For example, CDMA can be used to for configuration of channels within the sub-fabric. Additional examples include WDMA, FHSS, DSSS, OFDMA, or other techniques.

It should be appreciated that configuration space 200 could include any number of dimensions. In some embodiments, fabric configuration space is a priori defined for use by an administrator fabric manager. In other embodiments, the fabric manager can define fabric configuration space 200 according to their needs. Further, in view that each sub-fabric would likely have different missions, it is quite likely that their individual isolation requirements will be different. Therefore, each sub-fabric could weight each dimension of fabric configuration space differently with respect to their needs.

In the example shown, a sub-fabric has a defined configuration vector, F, indicating relative attributes values for each dimension 210 through 260 respectively. The values have been normalized so they have roughly equal weight relative to each other with respect to the configuration space. The virtual air gap policy for the sub-fabric might include a custom weight vector, W, representing weighting factors for how important each attribute of the dimensions is with respect to the virtual air gap. Based on the configuration vector and weight vector, a virtual air gap distance, $D_A$, can be calculated; possibly based on the dot product (i.e., $D_A = W \cdot F$) of the two vectors as shown. For the example shown, the virtual air gap distance is considered to have a value 18.8.

When the corresponding sub-fabric is instantiated and its corresponding virtual air gap has been provisioned, it can comprise a minimum distance within the configuration space (e.g., 18.8 in the example shown) between network elements within the sub-fabric relative to network elements external to the sub-fabric. In view that the fabric comprises discreet components, it will be unlikely to match the minimum distance exactly. Thus, the virtual air gap can be provisioned to have a distance equal to or greater than the minimum distance. For example, the minimum distance might be measured according to at least a device component level (e.g., memory, core, CPU, etc.) or even at the device level (e.g., chassis, rack, etc.).

FIG. 3 illustrates a metaphorical representation of virtual air gap 340 relative to networking nodes 310 in fabric 300 and sub-fabric 320. Fabric 300 comprises a larger number of networking nodes 310 (e.g., distributed core switches, routers, etc.) that are physically connected to each other, possibly via optic fiber connections. Nodes 310 could be deployed over the geographically significant distances (e.g., across a continent, across a city, etc.), within building, across the world, in a war ship, or other configurations. Configuration node 315 is one of networking nodes 310 that has been configured to or programmed to be operable according to the roles or responsibilities of the network configuration device 110 from FIG. 1. Configuration node 315 has instantiated sub-fabric 320 from some of nodes 310 and as provisioned fabric 300 with virtual air gap 340. In a metaphorical sense, virtual air gap 340 comprises gap distance 345, which could represent both physical as well as logical isolation factors.

In the example shown, sub-fabric 320 couples with one or more external nodes 310 via locked down connections 330. This example indicates that sub-fabric 320 could remain physically connected to other devices, but such connections might be inactive, powered down, mechanically decoupled (e.g., via a solenoid, etc.), electrically decoupled, or in other inactive states. Such an approach is considered advantageous in military settings, perhaps on a war ship. Fabric 300 could comprise a fabric deployed on an aircraft carrier where sub-fabric 320 represents an isolated secret fabric. When the need arises, the sub-fabric could be expanded to incorporate additional networking nodes 310 or contracted to release nodes back to fabric 300. Thus, only a single set of networking nodes are required to support the aircraft carriers network isolation needs.

Figure 4:
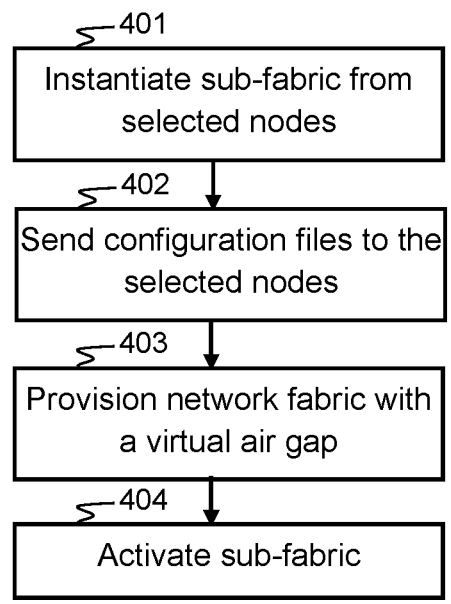
FIG. 4 is a flow chart that depicts a method that is performed in accordance with some aspects of the disclosure.

FIG. 4 is a flow chart that depicts a method that is performed in accordance with some aspects of the disclosure. A sub-fabric is instantiated from selected nodes 401 of a plurality of interconnected networking nodes in a network fabric. Configuration files are sent to the selected nodes 402 to configure the sub-fabric with an internal routing policy according to fabric isolation criteria defined with respect to a fabric configuration space. The network fabric is provisioned with a virtual air gap 403, and the sub-fabric is activated 404.

By way of example, a network configuration device (e.g., server, networking nodes, switch, router, web server, etc.) can be configured or programmed to instantiate one or more sub-fabrics 401 within the network fabric according to a virtual air gap policy. In one aspect, the network configuration device comprises a memory configured to store one or more virtual air gap policies that describe the nature of how the instantiated sub-fabric should be isolated relative to the main fabric or other nodes. The virtual air gap policy includes fabric isolation criteria that define the nature of the isolation with respect to attributes in a fabric configuration space (e.g., physical isolation, temporal isolation, data isolation, logical isolation, etc.). The network configuration device can comprise a fabric provisioning module coupled with the memory and configured or programmed to construct the sub-fabric along with the associated virtual air gap.

The fabric provisioning module instantiates the sub-fabric 401 from at least some of the networking nodes in the main fabric.

The network configuration device communicates configuration files to the selected nodes 402 to configure the sub-fabric with an internal routing policy by which the sub-fabric ensures that internal packets remain isolated and respects the fabric isolation criteria. The provisioning module also provisions the fabric with a virtual air gap 403 around the sub-fabric according to the virtual air gap policy. The virtual air gap can be considered to form a DMZ, possibly having a characterized distance, between the network fabric and the newly instantiated, isolated sub-fabric.

When ready, the network configuration device can cause the sub-fabric to be activated 404. In some embodiments, the provisioning module might instruct the sub-fabric to be activated 404 upon configuration of the sub-fabric's internal routing policy. In other embodiments, the sub-fabric might be activated 404 after establishing the virtual air gap. For example, the last communication between the network configuration device and the sub-fabric might be an activation command just as the virtual air gap takes effect.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A network configuration device for configuring a fabric of interconnected networking nodes, the network configuration device comprising:
    a memory configured to at least store an air gap policy comprising fabric isolation criteria defined with respect to a multi-dimensional fabric configuration space; and
    a processor coupled with the memory, wherein the processor is configured to execute instructions stored in the memory to:
        identify, based on the fabric isolation criteria of the air gap policy, a subset of the interconnected networking nodes for constructing a sub-fabric within the fabric;
        cause a transmission of at least one configuration instruction to at least one of the interconnected networking nodes in the subset of interconnected networking nodes, the at least one configuration instruction indicating an internal routing policy for the sub-fabric;
        provision, at least in part based on the air gap policy, the fabric with an air gap to isolate the subset of the interconnected networking nodes of the sub-fabric from external nodes of the fabric; and
        cause a state change of interconnects between the interconnected networking nodes, when the fabric is provisioned with the air gap;
    wherein each of the interconnected networking nodes in the subset of interconnected networking nodes is physically isolated from the external nodes of the fabric in response to the air gap policy specifying an air gap configuration for said node, and is virtually isolated from the external nodes of the fabric in response to the air gap policy specifying a virtual air gap configuration for said node; and
    wherein the state change includes turning off power to a connection between at least one node of the subset of the interconnected networking nodes of the sub-fabric and external nodes of the fabric, mechanically decoupling the connection, electrically decoupling the connection, or disabling a port driver of the connection.

2. The network configuration device of claim 1, wherein all of the interconnected networking nodes in the subset of interconnected networking nodes are physically isolated from the external nodes of the fabric.

3. The network configuration device of claim 1, wherein the state change includes physically isolating at least one node of the subset of the interconnected networking nodes of the sub-fabric from external nodes of the fabric.

4. The network configuration device of claim 1, wherein the state change is turning off power to the connection between the at least one node of the subset of the interconnected networking nodes of the sub-fabric and the external nodes of the fabric.

5. The network configuration device of claim 1, wherein the state change is mechanically decoupling the connection between the at least one node of the subset of the interconnected networking nodes of the sub-fabric and the external nodes of the fabric.

6. The network configuration device of claim 5, wherein the state change includes mechanically decoupling the connection via a solenoid.

7. The network configuration device of claim 5, wherein the state change includes physically disconnecting a communication cable between the at least one node of the subset of the interconnected networking nodes of the sub-fabric and the external nodes of the fabric.

8. The network configuration device of claim 1, wherein the state change is electrically decoupling the connection between the at least one node of the subset of the interconnected networking nodes of the sub-fabric and the external nodes of the fabric.

9. The network configuration device of claim 1, wherein the state change is disabling a port driver of the connection between the at least one node of the subset of the interconnected networking nodes of the sub-fabric and the external nodes of the fabric.

10. The network configuration device of claim 1, wherein the processor is configured to execute the instructions stored in the memory to send an activation command to the sub-fabric subsequent to at least one of transmit the at least one configuration instruction to at least one of the interconnected networking nodes in the subset of interconnected networking nodes or provision the fabric with the air gap.

11. The network configuration device of claim 1, wherein the fabric isolation criteria comprises a heart-beat protocol.

12. The network configuration device of claim 11, wherein at least one interconnected networking node within the sub-fabric is configured, at least in part based on the heart-beat protocol, to send a packet external to the sub-fabric, and the at least one networking node within the sub-fabric is configured, at least in part based on the heart-beat protocol, to receive a packet external to the sub-fabric.

13. The network configuration device of claim 1, wherein the minimum isolation distance is measured according to at least one of a network configuration device component level and a network configuration device level.

14. The network configuration device of claim 1, wherein the internal routing policy is at least in part based on the fabric isolation criteria and specifies how the sub-fabric manages internal communications among the subset of interconnected networking nodes.

15. A method comprising:
   identifying, by a network configuration device at least in part based on information associated with a plurality of interconnected networking nodes in a network fabric, a subset of interconnected networking nodes from the plurality of interconnected networking nodes, wherein the subset of interconnected networking nodes comprises a sub-fabric within the network fabric;
   communicating, by the network configuration device, at least one configuration instruction to at least one of the interconnected networking nodes in the subset of interconnected networking nodes to configure the sub-fabric according to an internal routing policy, wherein the internal routing policy is at least in part based on network fabric isolation criteria defined with respect to a multi-dimensional network fabric configuration space;
   provisioning, by a network configuration device at least in part based on an air gap policy, the network fabric with an air gap relative to the sub-fabric, wherein the subset of the interconnected networking nodes comprising the sub-fabric are isolated from external nodes of the network fabric; and
   sending, by the network configuration device, an activation command to the sub-fabric subsequent to at least one of transmitting the at least one configuration instruction to at least one of the interconnected networking nodes in the subset of interconnected networking nodes or provisioning the network fabric with the air gap,
   wherein each of the interconnected networking nodes in the subset of interconnected networking nodes is physically isolated from the external nodes of the network fabric in response to the air gap policy specifying an air gap configuration for said node, and is virtually isolated from the external nodes of the network fabric in response to the air gap policy specifying a virtual air gap configuration for said node.

16. The method of claim 15, wherein the provisioning comprises causing a state change of interconnects between the interconnected networking nodes when the network fabric is provisioned with the air gap.

17. The method of claim 16, wherein the state change includes physically isolating at least one node of the subset of the interconnected networking nodes of the sub-fabric from external nodes of the fabric.

18. A non-transitory computer-readable storage medium including program code which, when executed by at least one processor, causes operations comprising:
   identifying, at least in part based on information associated with a plurality of interconnected networking nodes in a network fabric, a subset of interconnected networking nodes from the plurality of interconnected networking nodes, wherein the subset of interconnected networking nodes comprises a sub-fabric within the network fabric;
   transmitting at least one configuration instruction to at least one of the interconnected networking nodes in the subset of interconnected networking nodes to configure the sub-fabric according to an internal routing policy, wherein the internal routing policy is at least in part based on network fabric isolation criteria defined with respect to a multi-dimensional network fabric configuration space; and
   provisioning, at least in part based on an air gap policy, the network fabric with an air gap relative to the sub-fabric, wherein the subset of the interconnected networking nodes comprising the sub-fabric are isolated from external nodes of the network fabric; and
   sending, by the network configuration device, an activation command to the sub-fabric subsequent to at least one of transmitting the at least one configuration instruction to at least one of the interconnected networking nodes in the subset of interconnected networking nodes or provisioning the network fabric with the air gap,
   wherein each of the interconnected networking nodes in the subset of interconnected networking nodes is physically isolated from the external nodes of the network fabric in response to the air gap policy specifying an air gap configuration for said node, and is virtually isolated from the external nodes of the network fabric in response to the air gap policy specifying a virtual air gap configuration for said node.

* * * * *